F. B. MORSE.
King-Bolt Socket.
No. 103,274.
Patented May 17, 1870.
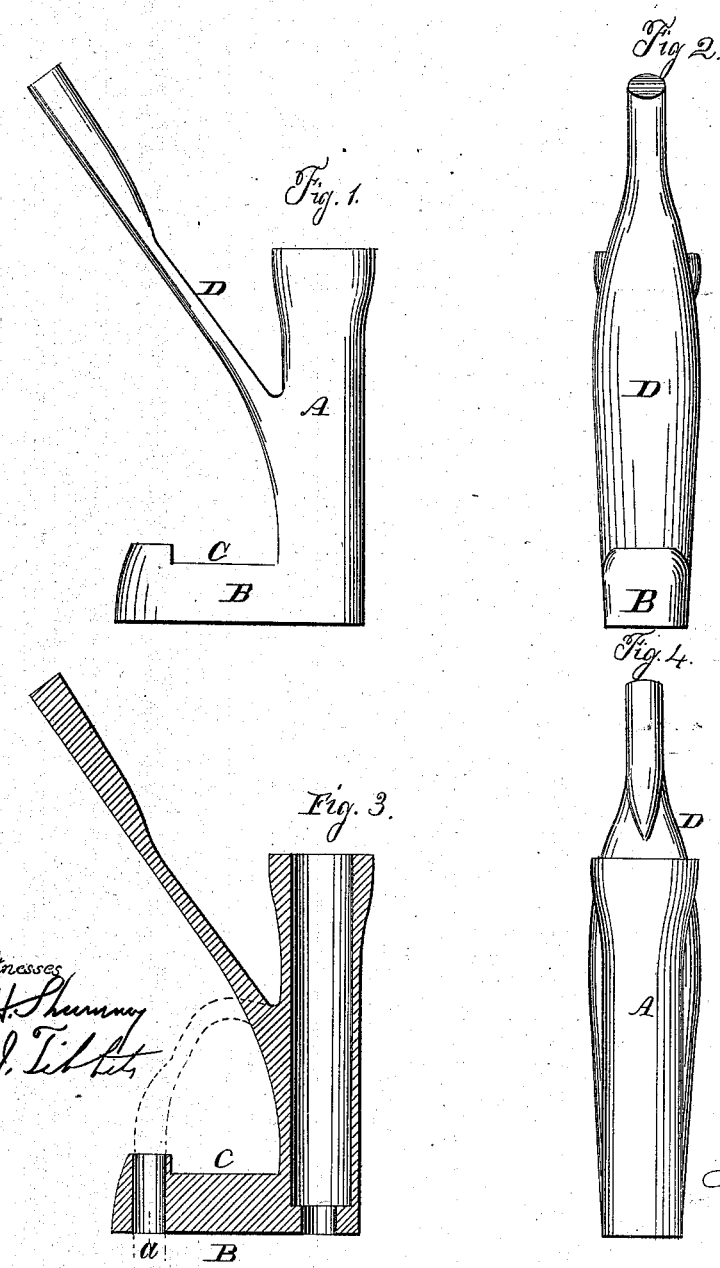

United States Patent Office.

FRANCIS B. MORSE, OF PLANTSVILLE, CONNECTICUT, ASSIGNOR TO HIMSELF AND H. D. SMITH & CO., OF SAME PLACE.

*Letters Patent No. 103,274, dated May 17, 1870; antedated May 12, 1870.*

IMPROVED KING-BOLT SOCKET FOR CARRIAGES.

The Schedule referred to in these Letters Patent and making part of the same.

*To all whom it may concern:*

Be it known that I, FRANCIS B. MORSE, of Plantsville, in the county of Hartford and State of Connecticut, have invented a new Improvement in King-bolt Socket for Carriages; and I do hereby declare the following, when taken in connection with the accompanying drawings and the letters of reference marked thereon, to be a full, clear, and exact description of the same, and which said drawings constitute part of this specification, and represent in—

Figure 1, a side view;
Figure 2, a front view;
Figure 3, a vertical central section; and in
Figure 4, a rear view.

This invention relates to an improvement in the article of manufacture known to the trade as king-bolt socket for carriages, that is to say, the socket which is attached to the axle to receive the king-bolt; and It consists in forming the socket, clip-bar, and clip, all in one and the same piece.

Heretofore the socket and clip have been formed in one piece and the bar in another, the socket held down to the bar by the nut upon the king-bolt; therefore, whenever the shoulder on the king-bolt or socket has in any degree worn away by use, the hold upon the clip-bar is reduced by just so much as the wear. This occasions the necessity of often tightening the king-bolt nut, a necessity which is entirely avoided by my improvement.

A is the socket for king-bolts, of the usual or any desirable form.

B, the clip-bar, formed upon the lower end of the socket, so as to extend across the under side of the axle, and with a seat, C, to rest upon the axle.

D is the clip, formed upon the socket so as to pass around the axle and its bolt-end, through a perforation, *a*, in the clip-bar.

The last bend required around the axle is made by the consumer, the article being left by the manufacturer in the form seen in the drawings. Thus the socket is secured to the axle by a single nut, and so that it cannot be be affected by any wear upon the king-bolt.

I claim as my invention—

The herein described king-bolt socket, as an article of manufacture, consisting of the socket A, clip-bar, B, and clip D, all in one and the same piece.

F. B. MORSE.

Witnesses:
   JOHN H. SHUMWAY,
   A. J. TIBBITS.